Jan. 28, 1969   KATSUTOSHI TAGAMI   3,424,974
ELECTRIC GENERATING APPARATUS
Filed Oct. 20, 1966

INVENTOR.
Katsutoshi Tagami

3,424,974
ELECTRIC GENERATING APPARATUS

Katsutoshi Tagami, Tokyo, Japan, assignor to Kabushiki Kaisha Honda Gijutsu Kenkyusho, Tokyo, Japan
Filed Oct. 20, 1966, Ser. No. 588,109
Claims priority, application Japan, Oct. 30, 1965, 40/88,162
U.S. Cl. 322—27      6 Claims
Int. Cl. H02g 7/06; H02p 9/00

The present invention relates to electrical generating apparatus, preferably of the small and portable type.

Electrical generators include self-excited and separately-excited types. In the self-excited type the output characteristic is curved substantially at the low-speed, low-voltage portion of the characteristic curve, as will be shown, so that the voltage regulation ratio is poor in this portion. This is undesirable. In separately-excited generators, the output characteristic is substantially linear, as will be shown, and there isn't the phenomenon relative to voltage regulation described above. However, in the separately-excited type, the output power is small at the high-speed, high-voltage portion of the characteristic curve, compared with the self-excited type. Additionally, the current-voltage characteristics of the self-excited type, as well as of the separately-excited type, are not particularly advantageous. For example, in the case of the self-excited type there is a critical point at which the voltage rapidly drops at the time of producing large currents so that the generator is deficient when used, for example, as an electric power source for an electric motor as the required large current for starting cannot be provided.

The present invention has as an object the provision based on the difference between the self-excited type and the separately-excited type and by using these together of such an improved electrical generating apparatus that the same has a good output characteristic throughout its entire range of operation and can satisfactorily comply with the large current requirements for starting electric motors.

The apparatus of the invention comprises, for example, a main electrical generator and a subsidiary electrical generator of the permanent-magnet-excited type arranged to be driven together by a prime mover such as an internal combustion engine. The armature of the main generator itself and the armature of the subsidiary generator are both connected to the field coil of the main generator so that the main generator operates with the mixed advantages of the self-excited and separately-excited types.

According to a second feature of the invention a transformer is interposed in the circuit connecting the armature of the main generator with the load side, and the secondary of said transformer and the armature of the subsidiary generator are connected in series or in parallel with one another through respective rectifier circuits to the field coil of the main generator.

According to a third feature of the invention, an internal combustion engine is used as the prime mover and the subsidiary generator is provided with another armature which is used as an electric power source for the ignition circuit of said engine.

Embodiments of the present invention will next be explained with reference to the accompanying drawing in which.

Figure 1:
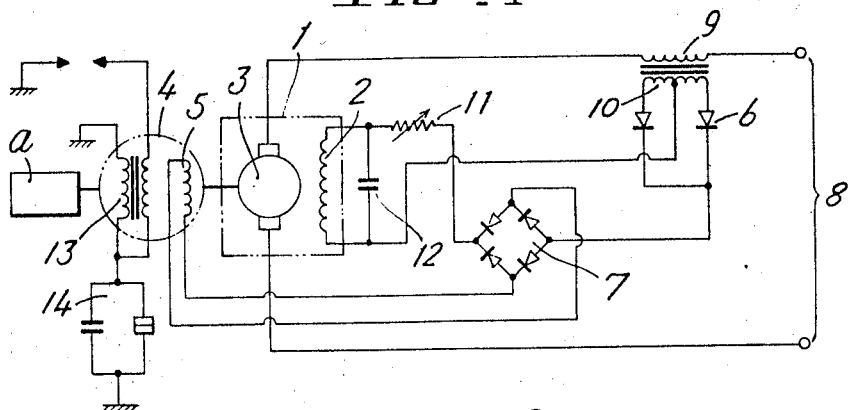
FIGURE 1 is a circuit diagram of one embodiment of the present invention.

Referring to the drawings, numeral 1 denotes a main generator having a field coil 2 and an armature 3, and numeral 4 denotes a subsidiary generator of the permanent-magnet type having an armature 5. Generators 1 and 4 are both connected to a prime mover a such as an internal combustion engine to be driven thereby. Output power is produced at armatures 3 and 5 and this power is supplied through respective rectifier circuits 6 and 7 to the field coil 2 of the main generator 1. This operates said generator 1 with the combined advantages of self-excited and separately-excited generators. Namely, the field coil 2 of the main generator 1 is given the output power of its own armature 3 to operate as a self-excited type and, at the same time, is given the output power of the subsidiary generator 4 to act as a separately-excited type.

In this way, the output power characteristic of the generator 1 is the combined result of the self-excited and separately-excited types. This is shown in full lines in FIGS. 3 and 4 respectively, as a composite result which is an excellent one with the respective defects of the self-excited and separately-excited types being compensated.

Figure 3:
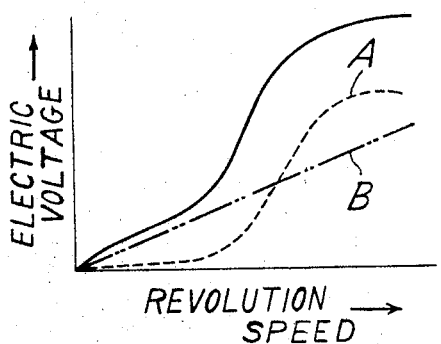
FIGURES 3 and 4 are characteristic-curve diagrams explaining the operation thereof.
Figure 4:
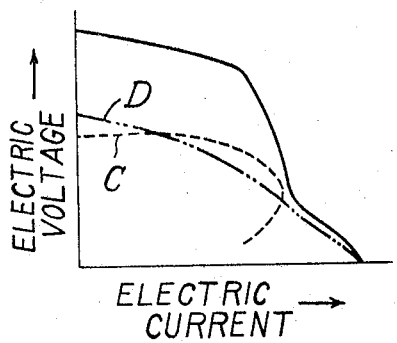

In other words, the solid line curve of FIG. 3 is an improvement over curve A of the self-excited and over curve B of the separately-excited type, while the solid line curve of FIG. 4 is an improvement over curves C and D respectively representing the self-excited and separately-excited types.

Among the reasons for this are that, for example, curve A in FIG. 3 is substantially curved in the low-speed, low-voltage range, thus giving rise to very poor regulation whereas, for example, curve C has reversing point at maximum current which is a poor characteristic.

Figure 2:
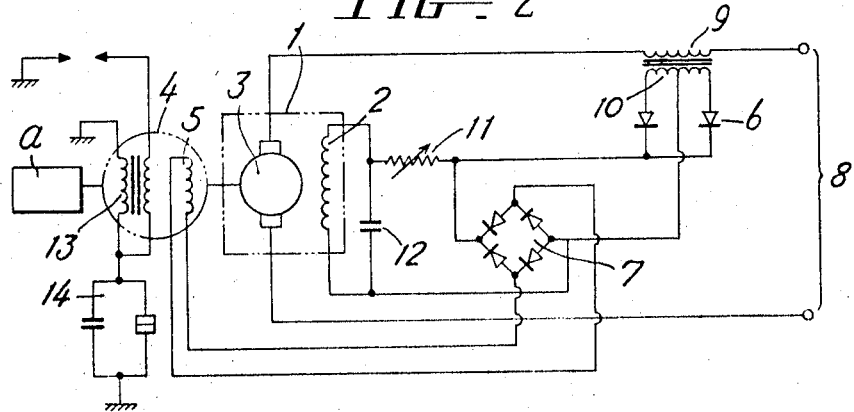
FIGURE 2 is a circuit diagram of another embodiment of the invention.

In the example illustrated in FIG. 1, the armature 3 of the main generator 1 is not connected directly to its own field coil 2. There is instead interposed therebetween a transformer 9. This transformer is interposed in the circuit connecting the armature 3 with the load 8, and the secondary 10 thereof is connected to the field coil 2. If so constructed, the transformer 9 can serve as a regulator transformer and the impedance matching between the armature 3 and the field coil 2 becomes unnecessary, thus facilitating the design of the circuit. The secondary 10 and the armature 5 are connected in series to the field coil 2 in the example of FIG. 1, but the connection may be modified to a parallel connection as shown in FIG. 2. Numeral 11 denotes a variable resistance for the adjustment of current, and numeral 12 denotes a smoothing condenser.

In the illustrated examples, the subsidiary generator 4 is provided with another armature 13, which can be utilized as an electric power source for an ignition circuit 13 for the internal combustion engine constituting the prime mover a. Thus, the subsidiary generator 4 is advantageously used for both ignition and separate excitation purposes.

What is claimed is:

1. Generator apparatus comprising first and second generators, said first generator including an armature and field coil, said second generator including a permanent magnet for self-excitation and an armature, driving means for driving said generators, and means to connect the armatures of the first and second generators to the field coil of the first generator whereby the latter functions with the combined advantages of self-excited and separately-excited generators.

2. Apparatus as claimed in claim 1 comprising a transformer including a primary winding for connecting the armature of the first generator to a load and a secondary winding connected to the field coil of said first generator.

3. Apparatus as claimed in claim 2, wherein the secondary winding and armature of the second generator are connected in series to the field coil of the first generator.

4. Apparatus as claimed in claim 2, wherein the secondary winding and armature of the second generator are connected in parallel to the field coil of the first generator.

5. Apparatus as claimed in claim 2, wherein said driving means is an internal combustion engine including an ignition circuit and said second generator includes a second armature which constitutes a source of electrical power for said ignition circuit.

6. Apparatus as claimed in claim 2 comprising rectifier means coupled between said secondary winding and the field coil of said first generator.

References Cited

UNITED STATES PATENTS 2,748,340  5/1956  Brunner et al. _____ 322—86 X

ORIS L. RADER, *Primary Examiner.*

W. E. DUNCANSON, *Assistant Examiner.*

U.S. Cl. X.R.

290—41; 307—153; 322—37, 87